United States Patent
Onishi

(10) Patent No.: US 7,860,035 B2
(45) Date of Patent: Dec. 28, 2010

(54) COMMUNICATION DEVICE AND REMOTE MANAGEMENT SYSTEM

(75) Inventor: Kazuki Onishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 889 days.

(21) Appl. No.: 11/709,701

(22) Filed: Feb. 23, 2007

(65) Prior Publication Data

US 2007/0206514 A1    Sep. 6, 2007

(30) Foreign Application Priority Data

Mar. 1, 2006    (JP)    ............................. 2006-055288

(51) Int. Cl.
*H04B 7/005*    (2006.01)
(52) U.S. Cl. ..................... 370/278; 370/311; 358/1.1
(58) Field of Classification Search .................. 358/1.1; 370/278, 311, 328, 338; 709/223, 224, 226
See application file for complete search history.

(56) References Cited

U.S. PATENT DOCUMENTS 6,574,662 B2 *   6/2003   Sugiyama et al. ........... 709/223

2002/0143936 A1 *   10/2002   Yu .............................. 709/224
2005/0237543 A1 *   10/2005   Kikuchi ........................ 358/1.1

FOREIGN PATENT DOCUMENTS

JP    11-184325    7/1999
JP    2004-221696    8/2004

* cited by examiner

*Primary Examiner*—Jayanti K Patel
*Assistant Examiner*—Jung Park
(74) *Attorney, Agent, or Firm*—Dickstein Shapiro LLP

(57) ABSTRACT

A communication device is provided in a network including a plurality of network segments to which customer devices are connected respectively, the communication device being connected through a cable or radio communication line to a central management device so that management information required for remote management of the customer devices is exchanged between the communication device and the central management device through the communication line. In the communication device, a searching unit searches customer devices connected to a predetermined network segment among the plurality of network segments in the network by predetermined timing. A transmitting unit transmits segment configuration information of the predetermined network segment as a result of device searching by the searching unit through the communication line to the central management device by predetermined timing.

8 Claims, 5 Drawing Sheets

COMMUNICATION DEVICE AND REMOTE MANAGEMENT SYSTEM

BACKGROUND OF THE INVENTION

1. Field of the Invention

This invention generally relates to a communication device and a remote management system. More particularly, this invention relates to a communication device which performs automatic collection of configuration/management information needed for remote management of customer devices connected to a network segment and transmits the collected information to a central management device via a communication line. Also, this invention relates to a remote management system in which a central management device receives configuration/management information of customer devices of a network segment from a communication device and performs central management of the customer devices.

2. Description of the Related Art

Conventionally, in office automation (OA) devices, such as facsimile, copiers, printers and multi-function peripherals, it is desired to facilitate the maintenance of the devices and the maintenance and management of the consumable articles. For this purpose, there is provided a remote management system in which a communication device (such as a communication adapter) connected to the OA devices of the customer site and a central management device (such as in a service center of the device manufacturer) are connected by a cable or radio communication line. In the remote management system, the central management device collects various items of management information, such as maintenance management information, working state and failure information of the OA devices, through the communication device, and stores and analyzes the collected management information, so that various management processes, such as device maintenance management, failure correction management and consumable article management, are carried out. For example, see Japanese Patent No. 3493297.

In the conventional remote management system, a communication device is provided for every device, and the communication between the communication device and the central management device for the device management is performed individually for every device. In recent years, with the spread of network technology, an increasing number of the devices as objects of remote management are connected to a communication network so that the connection between the devices and the central management device is established via the network.

For this reason, there is proposed a remote management system in which the devices of the customer site connected to a communication network and a management terminal are connected via the network. A managing server of the service center is connected to the management terminal by a cable or radio communication line, and the managing server acquires the management information of the devices as objects of remote management which is collected by and stored in the management terminal, so that the managing server carries out remote management of the devices. For example, see Japanese Laid-Open Patent Application No. 2004-221696.

In the conventional remote management system of Japanese Laid-Open Patent Application No. 2004-221696, the managing server acquires the management information of the devices connected to the network which is collected by the management terminal connected to the network, and the managing server carries out remote management of the devices. However, if the configuration of the devices of the customer site connected to the network is changed, the managing server is unable to recognize the configuration change until the change is notified to the managing server by the administrator on the side of the devices etc. and registered into the managing server. Thus, there has been the necessity for improvement of the conventional remote management system, in order to perform the remote management of the devices appropriately.

Moreover, when a plurality of devices (such as printer, copier, facsimile, multi-function peripheral, etc.) connected to a large-scale network (such as a company network) are the objects of remote management, the network concerned may include a plurality of network segments and the devices as objects of remote management may be connected to each network segment.

In such network configuration, a network administrator in the company performs the management of network resources, while a device administrator, such as personnel in charge of general-affairs in the company, performs the stock management of the consumable articles of the respective devices.

However, for example, when one or more new devices are installed in the network and connected to one or more network segments so that the configuration of the devices on the network is changed, the managing server in the conventional remote management system is unable to recognize the configuration change. Unless the information of the configuration change in the company is transmitted to both the network administrator and/or the device administrator, it is difficult to perform the device management appropriately, without such information sent to the network administrator and/or the device administrator and there has been the necessity for improvement.

SUMMARY OF THE INVENTION

According to one aspect of the invention, there is provided an improved communication device and remote management system in which the above-described problems are eliminated.

According to one aspect of the invention there is provided a communication device which is adapted for monitoring the configuration of the network appropriately and performing the device management suitably and efficiently.

In an embodiment of the invention which solves or reduces one or more of the above-mentioned problems, there is provided a communication device which is provided in a network including a plurality of network segments to which customer devices are connected respectively, the communication device being connected through a cable or radio communication line to a central management device so that management information required for remote management of the customer devices is exchanged between the communication device and the central management device through the communication line, the communication device comprising: a searching unit searching customer devices connected to a predetermined network segment among the plurality of network segments in the network by predetermined timing; and a transmitting unit transmitting segment configuration information of the predetermined network segment as a result of device searching by the searching unit through the communication line to the central management device by predetermined timing.

In an embodiment of the invention which solves or reduces one or more of the above-mentioned problems, there is provided a remote management system in which a central management device and a communication device, provided in a network including a plurality of network segments to which customer devices are connected respectively, are connected through a cable or radio communication line, and management information required for remote management of the customer devices is exchanged between the central management device and the communication device through the communication line so that the management information for every customer device is stored in the central management device and the remote management system performs the remote management of the customer devices based on the stored management information, the communication device comprising: a searching unit searching customer devices connected to a predetermined network segment among the plurality of network segments in the network by predetermined timing; and a transmitting unit transmitting segment configuration information of the predetermined network segment as a result of device searching by the searching unit through the communication line to the central management device by predetermined timing, and the central management device comprising: a management-information storage unit storing the management information for every customer device therein; a configuration-information storage unit storing, when the segment configuration information of the predetermined network segment is received from the communication device, the received segment configuration information therein; and an outputting unit outputting the segment configuration information stored in the configuration-information storage unit.

According to the communication device in the embodiment of the invention, the customer devices connected to a predetermined network segment of the network are searched, and segment configuration information of the predetermined network segment as a result of device searching is transmitted to the central management device. This makes it possible to grasp automatically and appropriately the configuration of the devices of the predetermined network segment of the network, and it is possible to perform efficient and suitable device management.

According to the remote management system in the embodiment of the invention, the communication device of the customer site searches the customer devices connected to the predetermined network segment of the network of the customer site, and transmits segment configuration information of the predetermined network segment as a result of device searching to the central management device. The configuration information storage unit of the central management device stores, when the segment configuration information is received from the communication device of the customer site, the received information as the segment configuration information of the predetermined network segment, and the outputting unit outputs the segment configuration information stored in the configuration information storage unit. The remote management of the customer devices can be carried out based on the outputted segment configuration information. By supplying the outputted segment configuration information to the network administrator and/or device administrator of the customer site, it is possible to allow the network administrator and/or device administrator to easily recognize the configuration of the network segment and the remote management of customer devices can be performed suitably and efficiently.

BRIEF DESCRIPTION OF THE DRAWINGS

Other objects, features and advantages of the present invention will be apparent from the following detailed description when reading in conjunction with the accompanying drawings.

DETAILED DESCRIPTION OF PREFERRED EMBODIMENTS

A description will be given of an embodiment of the invention with reference to the accompanying drawings.

Figure 1:
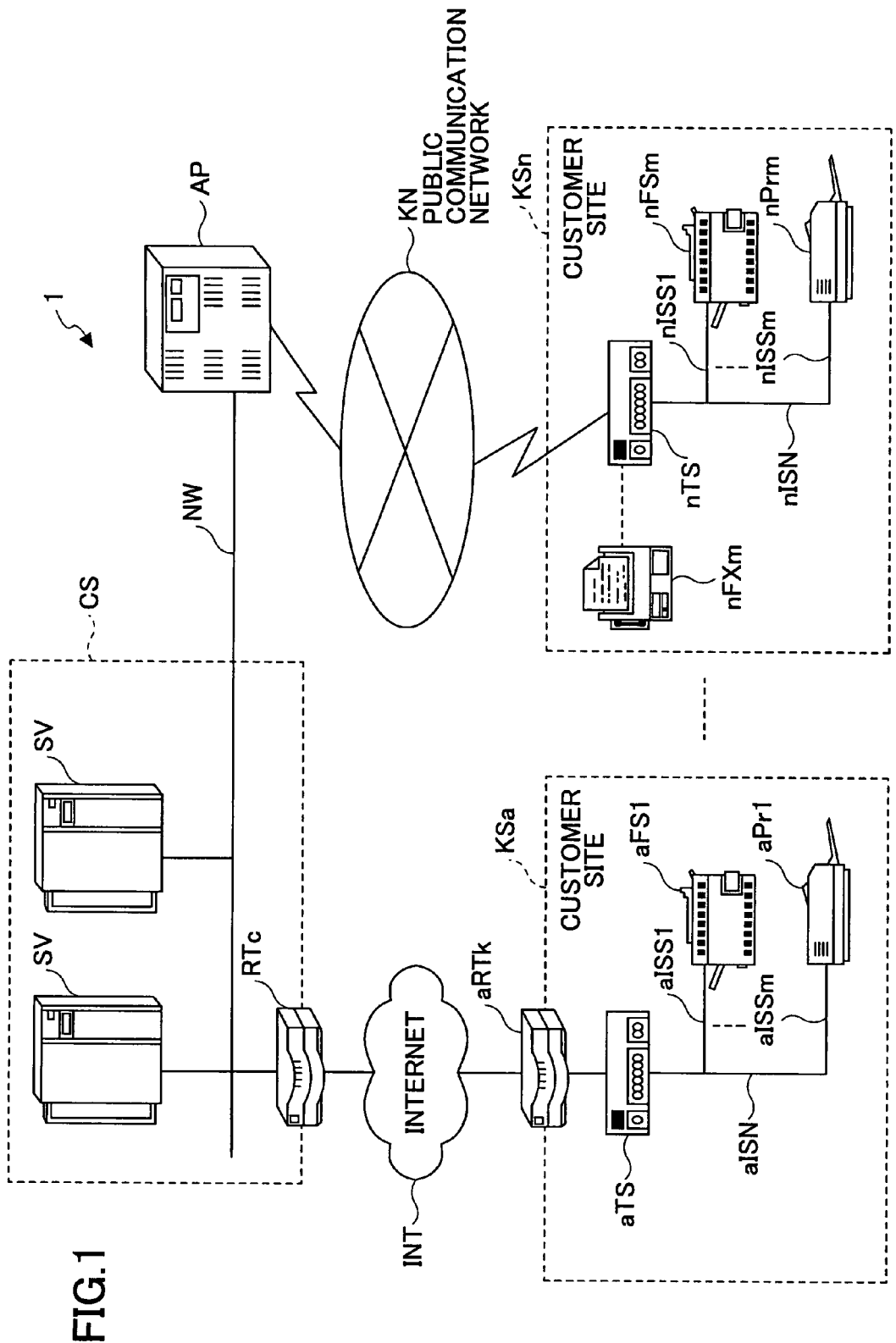
FIG. 1 is a diagram showing the composition of a remote management system to which an embodiment of the invention is applied.

FIG. 1-FIG. 5 are diagrams for explaining a remote management system and a communication device in an embodiment of the invention. FIG. 1 is a diagram showing the composition of a remote management system to which a communication device in an embodiment of the invention is applied.

In a remote management system 1 shown in FIG. 1, a center system CS and a plurality of customer sites KSa-KSn (which are a plurality of customers) are connected together via the Internet INT and a public communication network KN.

The center system CS is a service center, such as a device manufacturer or a service provision company. In the center system CS, a managing server (central management device) SV (which may include a plurality of server devices) and a router RTc are connected to a network NW (which may be a LAN (local area network)), and the network NW is connected to an access point AP of the public communication network KN. Other managing servers which support other computers and managing servers SV may be connected to the network NW. Alternatively, depending on the scale of objects of remote management, a single managing server SV may be connected directly to the Internet INT or the public communication network KN without network NW.

The managing server SV includes an administrative database DB (management-information storage unit, configuration-information storage unit) which stores various kinds of management data. See FIG. 2 through FIG. 5 for the administrative database DB of the center system CS. Stored for every customer in the administrative database DB of the center system CS is management information concerning customer devices in respective customer sites KSa-KSn as objects of remote management, which includes network device configuration/management information, customer information, and technical information.

For example, the network device configuration/management information contains a network configuration including network segments of each of customer sites KSa-KSn, a configuration of customer devices connected to each network segment, and a model, a device ID, a delivery date, an installation place, etc. of each customer device. The network device configuration/management information is the information that can identify a customer device as the object of remote management and its network configuration.

For example, the customer information contains a customer name, an address, a telephone number, a FAX number, a device administrator, a network administrator, etc. The customer information is the information that can identify a customer and contact information to the customer, and that can identify contact information to a device administrator and a network administrator, etc.

For example, the technical information contains a model, a device ID, a failure code, an estimated cause of failure, etc. The technical information is the information that can identify to some extent a phenomenon, a cause and a recovery measure of a malfunction of a customer device as the object of remote management.

In the customer sites KSa-KSn, there are provided respectively, communication devices aTS-nTS, Ethernet (registered trademark) aISN-nISN (which respectively form local area networks), and a plurality of customer devices as objects of remote management, including copiers aFS1-nFSm, printers aPr1-nPrm, and facsimiles aFX1-nFXm, etc. Each of the Ethernet aISN-nISN of the customer sites KSa-KSn includes a plurality of Ethernet segments aISS1-nISSm respectively which are a plurality of network segments as objects of remote management. The communication devices aTS-nTS in the customer sites KSa-KSn are connected to the Internet INT via the routers aRTk-nRTk or to the public communication network KN, as follows. For example, the communication device aTS in the customer site KSa is connected to the Internet INT via the router aRTk, and the communication device nTS in the customer site KSn is connected directly to the public communication network KN without router.

Figure 2:
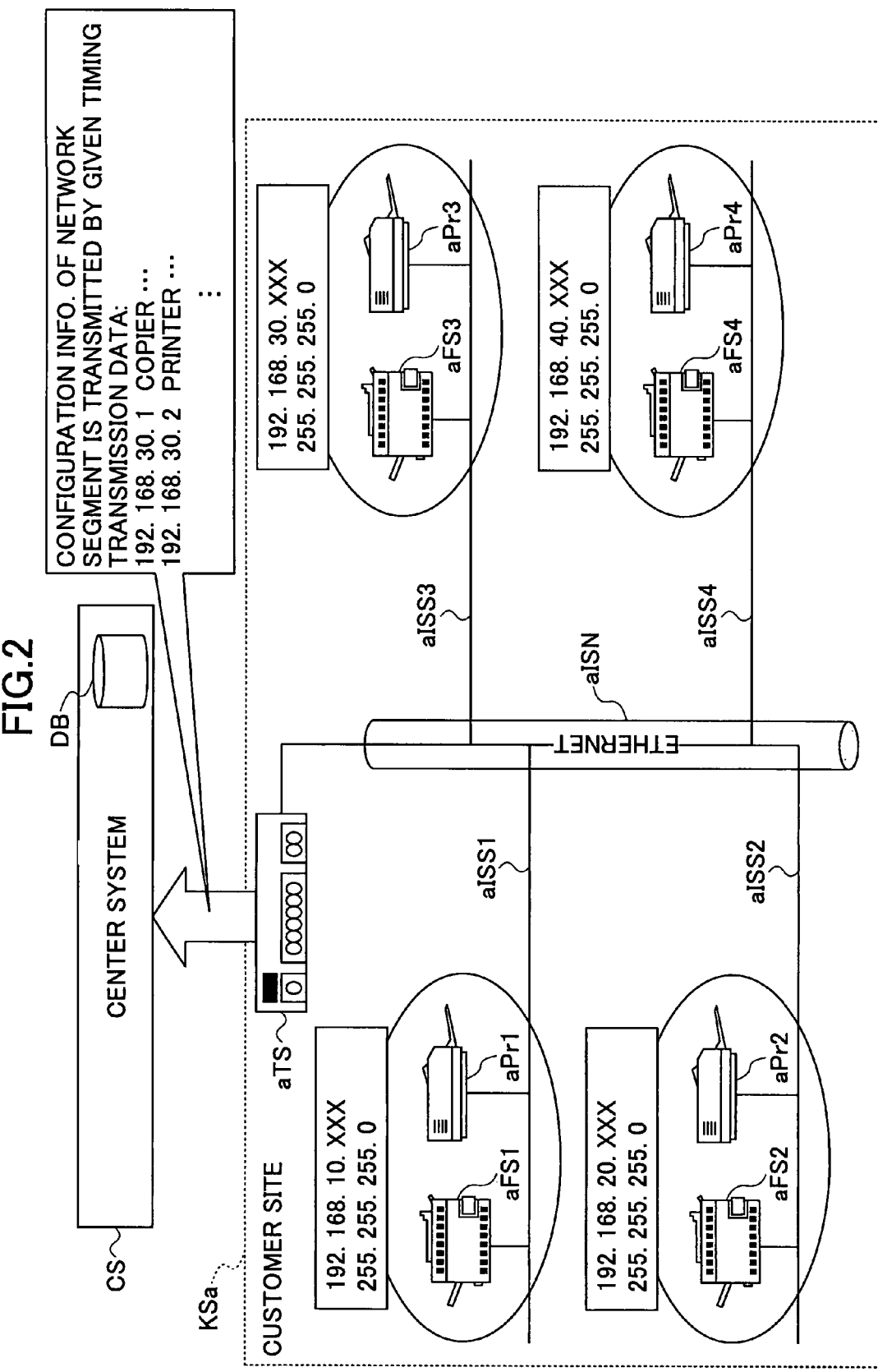
FIG. 2 is a diagram showing the network configuration and the device configuration of a customer site in the remote management system of FIG. 1.

Similar to the customer site KSa shown in FIG. 2, the respective customer sites KSa-KSn are arranged in a network configuration. Specifically, in the customer site KSa of FIG. 2, the Ethernet aISN is arranged in a network configuration, and four Ethernet segments aISS1-aISS4 are included in the network of the customer site KSa. For the sake of simplicity, the router aRTk as shown in FIG. 1 will be omitted in the composition of FIG. 2.

As the customer devices in the customer site KSa of FIG. 2, the copier aFS1 and the printer aPr1 are connected to Ethernet segment aISS1, the copier aFS2 and the printer aPr2 are connected to Ethernet segment aISS2, the copier aFS3 and the printer aPr3 are connected to Ethernet segment aISS3, and the copier aFS4 and the printer aPr4 are connected to Ethernet segment aISS4, respectively.

Suppose that the communication device aTS in FIG. 2 is set up so that the network IP address and the subnet mask of Ethernet segment aISS1 are "192.168.10.0" and "255.255.255.0", the network IP address and the subnet mask of Ethernet segment aISS2 are "192.168.20.0" and "255.255.255.0", the network IP address and the subnet mask of Ethernet segment aISS3 are "192.168.30.0" and "255.255.255.0", and the network IP address and the subnet mask of Ethernet segment aISS4 are "192.168.40.0" and "255.255.255.0".

Moreover, the timing of searching of Ethernet segments aISS1-aISS4 of respective objects of remote management and the timing of notification of the network device configuration information (which is the search results) to the center system CS are set up in the communication device aTS of the customer site KSa in FIG. 2.

The timing of searching and the timing of notification may be set up with the setup keys of the communication devices aTS-nTS. Alternatively, they may be set up in accordance with a control signal from the center system CS.

Specifically, in the example of FIG. 2, the communication device aTS is set up so that the timing of searching Ethernet segments aISS1-aISS4 is set to "once per day at AM 12:00", and the timing of notification of the network device configuration information of Ethernet segments aISS1-aISS4 to the center system CS is set to "once per week at Sunday AM 0:00".

Each of the communication devices aTS-nTS of the respective customer sites KSa-KSn is provided with the internal memory (configuration storage unit, storage unit) which stores the network device configuration/management information and customer information stored in the administrative database DB of the above-mentioned center system CS. In each of the communication devices aTS-nTS, the network device configuration information of the search results is stored into the internal memory as network device configuration and management information.

When a certain failure or abnormality (alarm condition, such as paper end, toner end, or paper jam) occurs in any of the copiers aFS1-nFSm, printers aPr1-nPrm and facsimiles aFX1-nFXm which are customer devices as the objects of remote management in the customer sites KSa-KSn, the customer device concerned (for example, copier aFS1) notifies automatically the failure code with additional information (such as date and time of occurrence of the error) to the communication devices aTS-nTS. The peripheral-device managing software, carried in each communication device aTS-nTS in the permanently residing state, performs polling communication to the customer devices as the objects of remote management by predetermined timing, in order to monitor the working state of each customer device and detect occurrence of any error of the customer devices. When an error notice is received from the customer device, or when the communication device aTS-nTS detects any error by polling, the communication device aTS-nTS promptly displays the abnormal condition on the display monitor thereof and notifies it to the managing server SV of the center system CS.

When the above-mentioned notice is received, the managing server SV of the center system CS searches the technical information stored in the administrative database DB by making the failure code in the received notice into a keyword, and extracts a failure name, a phenomenon, an estimated cause, and a recovery measure code from the failure code. And the managing server SV searches the network device configuration and management information by making the model and device ID in the received notice into a keyword, and specifies the customer. The managing server SV searches the customer information by making the specified customer into a keyword, and specifies the device service group in charge of the customer.

The managing server SV transmits the received data, the failure name, the phenomenon, the estimated cause, the recovery measure code, and a variety of information needed for other services, to the facsimile or electronic mail destination of the specified device service group.

And it is necessary to make the network device configuration/management information and customer information of the administrative database DB of the managing server SV, and the network device configuration/management information and customer information in the internal memories of the communication devices aTS-nTS of the respective customer sites KSa-KSn coincide with each other. For this purpose, the remote management system 1 performs check/correction processing of this management information by predetermined timing.

For example, the remote management system 1 performs the management information check/correction processing as follows. The managing server SV of the center system CS uses the SMTP (simple mail transfer protocol) communication function and transmits a request for receiving of management information to the communication devices aTS-nTS of the respective customer sites KSa-KSn.

When the request for receiving of management information is received from the managing server SV, each communication device aTS-nTS reads the network device configuration/management information and the customer information from the internal memory and transmits the same to the managing server SV of the system control part of the requesting node. That is, SMTP is a protocol used for exchange of an E-mail, and the managing server SV (which is the requesting node) writes the data in the desired range in the subject portion or the text of the E-mail, and transmits the same.

The range of such data may include the device information of a specific model, the customer information, the device information of the customer devices of all the objects of remote management of the customer sites KSa-KSn, and the configuration information of a specific one of Ethernet segments aISS1-aISS4, etc.

And the managing server SV of the center system CS collects the management information from each of the communication devices aTS-nTS of the respective customer sites KSa-KSn, and then writes the management information in the administrative database DB based on the collected management information, or corrects the management information which is previously stored based on the collected management information.

Next, a description will be given of operation of the remote management system in this embodiment will be explained.

The remote management system 1 of this embodiment automatically acquires the network device configuration of the customer sites KSa-KSn, and performs remote management of the customer devices based on the network device configuration acquired automatically.

Suppose that Ethernet segment aISS3 is set as the object of device searching among Ethernet segments aISS1-aISS4. The corresponding one of the communication devices aTS-nTS of the respective customer sites KSa-KSn performs searching of customer devices connected to Ethernet segment aISS3 as the objects of device searching by predetermined timing. This timing is set up beforehand with the communication device aTS in accordance with the control signal from the managing server SV of the center system CS or it is set up beforehand by using the setup button of each of the communication devices aTS-nTS; for example, once per day at AM 12:00).

Specifically, the searching of customer devices in this case is performed for customer devices connected to Ethernet segment aISS3 as the objects of device searching whose network IP address and subnet mask are "192.168.30.0" and "255.255.255.0" (for each IP address among "192.168.30.1-192.168.30.255"). The management information base (MIB) information for every IP address is acquired by using SNMP (simple network management protocol). Based on the acquired MIB information, it is determined whether it is a customer device (or it is determined whether RFC1514 1.3.6.1.2.1.25. HostResourceMIB is OID hrDevicePrinter (1.3.6.1.2.1.25.3.1.5) or not).

And suppose that the timing of notification of search results is set up with the corresponding one of the communication devices aTS-nTS so that "once per week at Sunday AM 0:00" is specified as the timing of notification of search results. For example, if the specified timing (AM 0:00 on every Sunday) is reached, the printer MIB information which indicates the search results of the customer devices is acquired by the communication device aTS using SNMP, and the communication device aTS transmits the acquired information to the center system CS as the configuration information of customer devices connected to Ethernet segment aISS3 as the objects of remote management.

And the center system CS stores the configuration information of Ethernet segments aISS1-nISSm of the respective customer sites KSa-KSn, received from the communication devices aTS-nTS of the customer sites KSa-KSn, into the administrative database DB, and outputs the configuration information stored in the administrative database DB by predetermined timing for each of the Ethernet segments aISS1-nISSm. For example, the configuration information for each of the Ethernet segments aISS1-nISSm is outputted in a report form.

The administrator in the center system CS transmits the configuration information of Ethernet segments aISS1-nISSm (especially, the report of configuration change information) by facsimile or E-mail to the network administrator and/or the device administrator of the customer sites KSa-KSn. And the administrator in the center system CS supplies the operating condition of customer devices to the network administrator and/or the device administrator of the customer sites KSa-KSn.

In this manner, each of the communication devices aTS-nTS of the respective customer sites KSa-KSn of the remote management system 1 of this embodiment searches the customer devices connected to a predetermined Ethernet segment aISS1-nISSm among the plurality of Ethernet segments aISS1-nISSm which constitute Ethernet aISN-nISN, and transmits the device search results to the managing server SV of the center system CS as the segment configuration information of the predetermined Ethernet segment.

Therefore, it is possible to grasp automatically and appropriately the configuration of the objects of remote management among the plurality of Ethernet segments aISS1-nISSm which constitute Ethernet aISN-nISN, and it is possible to perform efficiently and suitably the management of customer devices as the objects of remote management.

In the remote management system 1 of this embodiment, the communication device aTS-nTS of the customer sites KSa-KSn searches the customer devices connected to the predetermined Ethernet segment aISS1-nISSm among the plurality of Ethernet segment aISS1-nISSm which constitute Ethernet aISN-nISN of the customer sites KSa-KSn, and transmits the device search results to the managing server SV of the center system CS as the segment configuration information of the predetermined Ethernet segment.

The managing server SV of the center system CS stores the segment configuration information received from the communication devices aTS-nTS of the respective customer sites KSa-KSn into the administrative database DB as the segment configuration information of the Ethernet segment aISS1-nISSm in the network configuration of the customer sites KSa-KSn, and outputs the stored segment configuration information. Therefore, the administrator in the center system CS can perform the management of the customer devices of the respective customer sites KSa-KSn based on the outputted segment configuration information. Moreover, by supplying the outputted segment configuration information to the network administrator and/or device administrator of the respective customer sites KSa-KSn by facsimile or E-mail, the network administrator and/or device administrator can grasp the configuration of the objects of remote management appropriately and promptly, so that the remote management of the customer devices can be performed appropriately. The management of customer devices can be performed appropriately, while saving the time and effort of the management work of the network administrator or the device administrator.

Each of the communication devices aTS-nTS of the respective customer sites KSa-KSn in this embodiment is provided so that, if the notice for specifying Ethernet segment aISS1-nISSm as the objects of device searching is received from the managing server SV of the center system CS, the communication device searches the customer devices connected to Ethernet segment aISS1-nISSm which is specified as the object of device search. Therefore, the segment configuration and management information of the specified Ethernet segment aISS1-nISSm can be acquired promptly and appropriately, and the management of customer devices can be performed appropriately.

Alternatively, each of the communication devices aTS-nTS of the respective customer sites KSa-KSn may be configured so that the communication device searches a change in the segment configuration as well as the existing segment configuration, and transmits the search results to the managing server SV of the center system CS for every Ethernet segment aISSn-nISSm.

Figure 3:
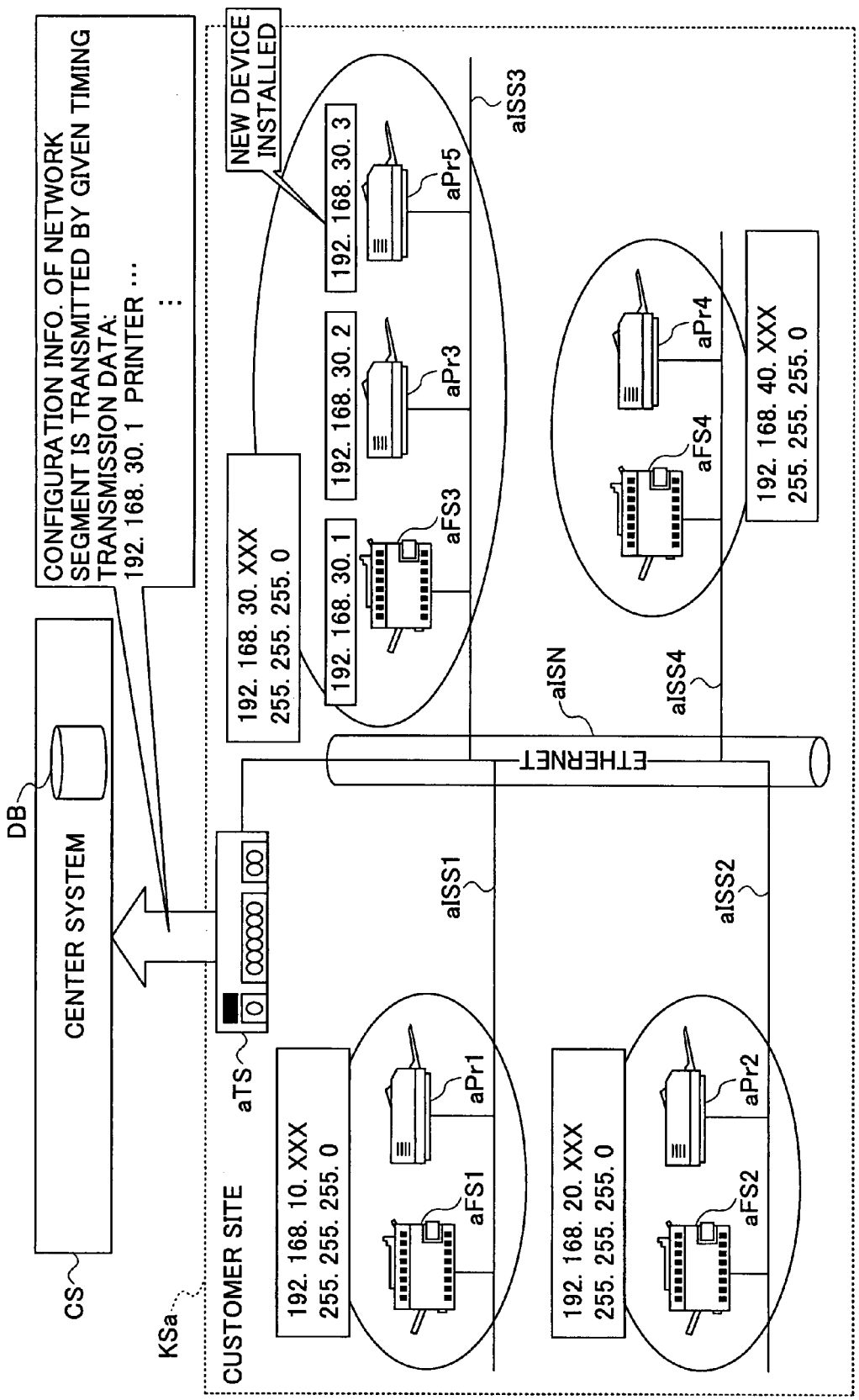
FIG. 3 is a diagram for explaining a configuration change information acquisition/notification process performed when a change in a segment configuration of the Ethernet segment of the customer site of FIG. 2 is detected.

For example, suppose that a printer aPr5 is newly installed in the Ethernet segment aISS3 among the objects of remote management in the customer site KSa as shown in FIG. 3. Suppose that the timing of device searching in the case of the customer site KSa of FIG. 3 is set up such that "once per day at AM 12:00" is specified as the timing of searching the customer devices connected to the Ethernet segment aISS3 (whose IP address is "192.168.30.0" and whose subnet mask is "255.255.255.0") among Ethernet segments aISS1-aISS4, and that "immediate" is specified as the timing of notification of configuration change to the center system CS at the time of detection of the configuration change.

In the case shown in FIG. 3, the communication device aTS of the customer site KSa is provided so that, when the timing of device searching is reached, the communication device aTS searches the customer devices connected to the network segment aISS3 among the Ethernet segments aISS1-aISS4 as objects of remote management, and acquires the management information base (MIB) information for each IP address of "192.168.30.1-192.168.30.255" in the IP address "255.255.255.0" using SNMP as mentioned above. The communication device aTS determines whether it is a customer device, based on the acquired information.

And when it is a customer device, the communication device aTS acquires the printer MIB information using SNMP, and stores the segment configuration information of Ethernet segments aISS1-aISS4 (in this case, Ethernet segment aISS3) as objects of remote management into the internal memory. And the communication device aTS detects whether there is a difference (or change) between the segment configuration information acquired as the device search results and the segment configuration information of Ethernet segments aISS1-aISS4 previously stored in the internal memory. For example, in the case of FIG. 3, the communication device aTS detects the newly installed printer aPr5 of the IP address "192.168.30.3" as being a change in the segment configuration information.

When a difference (change) between the segment configuration information as the device search results and the existing segment configuration information is detected, the communication device aTS notifies the configuration change information (configuration information concerning the changed customer device) to the managing server SV of the center system CS by the timing of notification of configuration change at the time of detection of the configuration change. For example, "immediate" timing is specified as the timing of notification as mentioned above.

When the notice of configuration change information is received from the communication device aTS-nTS of the customer sites KSa-KSn (for example, from the communication device aTS of the customer site KSa), the managing server SV of the center system CS performs correction processing of the segment configuration information of the administrative database DB for the Ethernet segment aISS1-nISSm as the objects of remote management in the customer site KSa based on the received configuration change notice, and stores the configuration change notice information in the administrative database DB. Moreover, the managing server SV of the center system CS outputs the configuration change information of the Ethernet segment aISS1-nISSm in a report form, etc.

Then, the administrator in the center system CS notifies, to the network administrator and/or the device administrator of the customer sites KSa-KSn, the report of the configuration change information of the Ethernet segment aISS1-nISSm of the customer sites KSa-KSn based on the outputted report by facsimile or E-mail, and supplies the operating condition of the customer devices concerned.

As described above, the communication device aTS-nTS of the respective customer sites KSa-KSn in the remote management system 1 of this embodiment searches the customer devices of Ethernet segment aISS1-nISSm for every Ethernet segment by predetermined timing, and stores the device search results into the internal memory as the segment configuration information for every Ethernet segment aISS1-nISSm. The communication device aTS-nTS of the respective customer sites KSa-KSn detects whether there is any change in the segment configuration information between the device search results and the segment configuration information of the Ethernet segment aISS1-nISSm previously stored in the internal memory. When a change in the segment configuration information is detected, the communication device aTS-nTS of the respective customer sites KSa-KSn transmits the segment configuration change information to the managing server SV of the customer sites KSa-KSn by predetermined timing. The managing server SV corrects the segment configuration information in the administrative database DB based on the received configuration change information, and outputs the configuration change information in a report form.

Accordingly, a change of the segment configuration of the predetermined Ethernet segment aISS1-nISSm as the objects of remote management in the respective customer sites KSa-KSn can be acquired automatically, and the network administrator and/or the device administrator of the respective customer sites KSa-KSn are notified of the change of the segment configuration. This makes it possible to grasp the change of the segment configuration as objects of remote management appropriately and promptly and perform the remote management of customer devices appropriately. Thus, the remote management of customer devices can be performed appropriately while saving the working time and effort of the network administrator or the device administrator.

Furthermore, the remote management system 1 of this invention not only performs the acquisition of the segment configuration of Ethernet segment aISS1-nISSm as the objects of remote management and notification of the acquisition results to the center system CS, but also performs acquisition of the management information (working state information, status information, abnormality information, etc.) for every customer device of remote management object, such as copiers aFS1-nFSm, printers aPr1-nPrm, and facsimiles aFX1-nFXm, and notification of the acquisition results to the center system CS.

Figure 4:
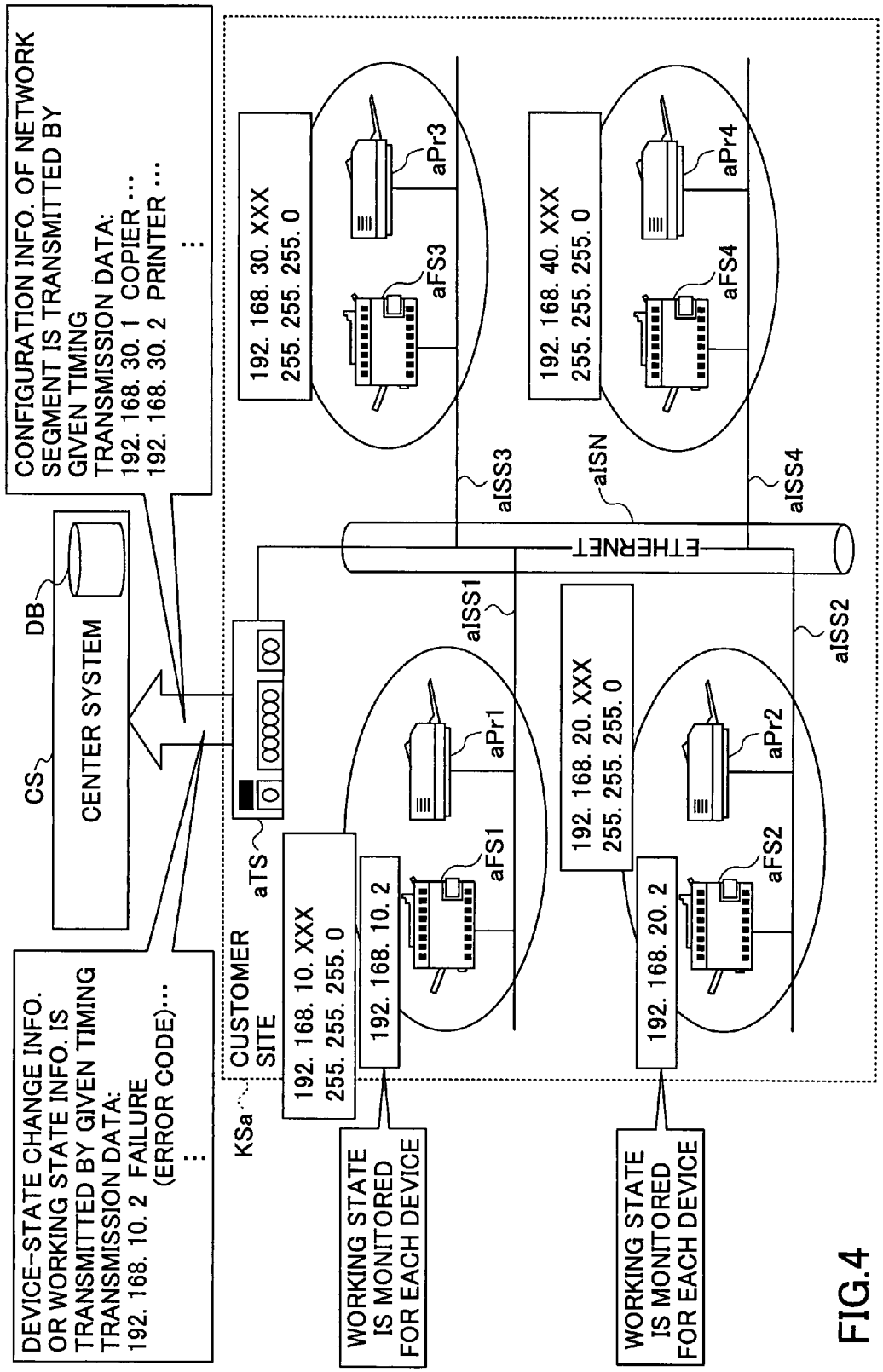
FIG. 4 is a diagram for explaining a device-state information acquisition/notification process and a configuration information acquisition/notification process performed for the customer site of FIG. 2.

For example, suppose that the timing setup is performed in the customer site KSa shown in FIG. 4 so that "once per day at AM 12:00" is specified as the timing of configuration search, "once per week at Sunday AM 0:00" is specified as the timing of notification of configuration, "once per day at AM 12:00" is specified as the timing of configuration change search, and "immediate" is specified as the timing of notification of configuration change. Moreover, suppose that the timing setup is performed in the customer site KSa of FIG. 4 so that "once per day at AM 12:00" is specified as the timing of device state search for the individual objects of remote management, and "immediate" is specified as the timing of notification of device state change which is the timing of notification of device state change at the time of detection of the device state change.

For example, the communication device aTS of the customer site KSa shown in FIG. 4 searches, by the timing of configuration search, the segment configuration of Ethernet segments aISS1-aISS4 as objects of remote management, and notifies the search results to the managing server SV of the center system CS by the timing of notification of configuration.

When the Ethernet segment aISS3 among the Ethernet segments aISS1-aISS4 is specified as objects of remote management as shown in FIG. 4, the searching of customer devices in this case is performed such that the management information base (MIB) information is acquired for every IP address of "192.168.30.1-192.168.30.255" of the Ethernet segment aISS3 (IP address "192.168.30.0", subnet mask "255.255.255.0") using SNMP. And the communication device aTS determines whether it is a customer device. That is, it is determined whether RFC1514 1.3.6.1.2.1.25. HostResourceMIB is OID hrDevicePrinter (1.3.6.1.2.1.25.3.1.5).

When it is a customer device, the communication device aTS acquires the printer MIB information using SNMP and stores the acquired information in the internal memory as the segment configuration information of Ethernet segment aISS3 as objects of remote management. The communication device aTS transmits the segment configuration information to the managing server SV of the center system CS by the timing of notification of configuration (for example, once per week at Sunday AM 0:00).

Moreover, the communication device aTS searches the configuration of Ethernet segments aISS1-aISS4 as objects of remote management (for example, Ethernet segment aISS3) by the timing of configuration change search, and stores the device search results in the internal memory as configuration information of Ethernet segment aISS3 which is the object of remote management. The communication device aTS detects whether there is any change (difference) in the segment configuration information between the device search results and the segment configuration information previously notified to the center system CS.

When a change in the segment configuration information is detected, the communication device aTS notifies the configuration change information to the managing server SV of the center system CS by the timing of notification of configuration change (for example, "immediate" timing).

Moreover, when the timing of device state search (for example, "once per day at AM 12:00") is reached, the communication device aTS acquires the management information of every customer device, such as device state information and working state information of each device as objects of remote management (for example, copier aFS1 of the IP address "192.168.10.2", copier aFS2 of the IP address "192.168.20.2" in the case of FIG. 4).

This management information is acquired by using HTTPS (SOAP) from the device information of the customer devices of the IP addresses "192.168.10.2" and "192.168.20.2" as the objects of remote management. And the communication device aTS stores the acquired management information in the internal memory as the device management information. The communication device aTS detects whether there is any problem in the working state of the individual customer devices, such as a device failure, based on the stored device management information. When a problem in the device working state is detected, the communication device aTS transmits the device management information to the managing server SV of the center system CS by the specified timing of notification of device state change (for example, "immediate" timing).

When the notice of the device state change of the objects of remote management in the respective customer sites KSa-KSn is received from the communication devices aTS-nTS of the customer sites KSa-KSn, the center system CS stores the device state change notice information of the customer sites KSa-KSn into the administrative database DB, and outputs the device state change information in a report form etc. The administrator in the center system CS transmits the device state change information to the network administrator and/or device administrator of the customer sites KSa-KSn. When the device state change information indicates a need for repair of a customer device, the managing server SV of the center system CS searches the service person in charge of the device concerned, and transmits the device state change information and a necessary recovery measure to the service person in charge.

Therefore, the communication device aTS-nTS of the customer sites KSa-KSn in the remote management system 1 of this embodiment collects the management information of predetermined customer devices (for every Ethernet segment aISS1-nISSm or for every customer device), transmits the collected information to the administrative server SV of the center system CS. The managing server SV of the center system CS stores the received management information into the administrative database DB, and carries out the management of the customer devices based on the management information and the segment configuration information stored in the administrative database DB.

Therefore, when there is a device state change in the customer devices as objects of remote management, the device state change can be promptly recognized by both the center system CS and the customer sites KSa-KSn and the necessary recovery measure can be taken promptly, and the management of customer devices can be performed appropriately and promptly.

In the remote management system 1 of the above-mentioned embodiment, the reporting destination to which the configuration information, the configuration change information and the device management information are transmitted is set to the center system CS only. The present invention is not limited to this embodiment. Alternatively, the remote management system of the invention may be configured so that the above-mentioned information is notified to not only the center system CS but also the administrator terminals aPK-nPK of the network administrators of the respective customer sites KSa-KSn.

Figure 5:
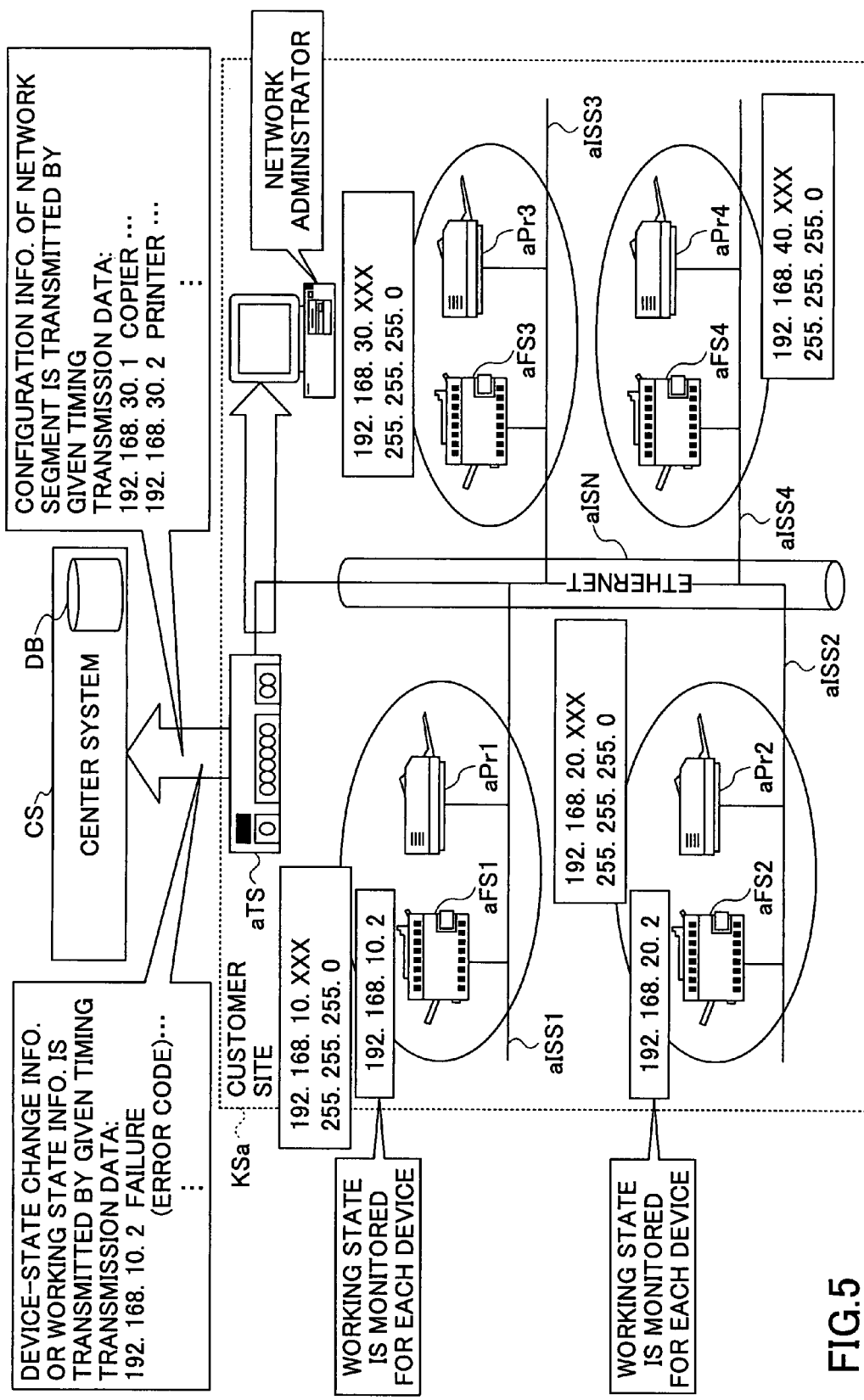
FIG. 5 is a diagram for explaining a device-state information acquisition/notification process and a configuration information acquisition/notification process in which the acquired information is transmitted also to a network administrator terminal in the customer site of FIG. 4.

For example, suppose that the timing setup is performed in the customer site KSa shown in FIG. 5, similar to the above-mentioned case of FIG. 4, so that "once per day at AM 12:00" is specified as the timing of configuration search, "once per week at Sunday AM 0:00" is specified as the timing of notification of configuration, "once per day at AM 12:00" is specified as the timing of configuration change search, and "immediate" is specified as the timing of notification of configuration change. Moreover, suppose that the timing setup is performed in the customer site KSa of FIG. 5 so that "once per day at AM 12:00" is specified as the timing of device state search for the objects of remote management, and "immediate" is specified as the timing of notification of device state change which is the timing of notification of device state change at the time of detection of the device state change.

For example, the communication device aTS of the customer site KSa of FIG. 5 searches the configuration of Ethernet segments aISS1-aISS4 as objects of remote management by the timing of configuration search, and notifies the search results to the managing server SV of the center system CS by the timing of notification of configuration. In this case, when Ethernet segment aISS3 among Ethernet segments aISS1-aISS4 is specified as objects of remote management, as shown in FIG. 5, the communication device aTS acquires the management information base (MIB) information using SNMP from each IP address of "192.168.30.1-192.168.30.255" of Ethernet segment aISS3 (IP address "192.168.30.0", subnet mask "255.255.255.0"), and, like the above-mentioned embodiment, the communication device aTS determines whether it is a customer device based on the acquired MIB information.

And when it is a customer device, the communication device aTS acquires the printer MIB information using SNMP, and stores the same in the internal memory as configuration information of Ethernet segment aISS3 which is the object of remote management. By the timing of notification of configuration (for example, "once per week at Sunday AM 0:00"), the communication device aTS transmits the configuration information to the managing server SV of the center system CS, and transmits the same to network administrator terminals aPK-nPK connected to Ethernet aISN (in the case of FIG. 5, to the network administrator terminal aPK).

Moreover, by the timing of configuration change search, the communication device aTS searches the configuration of Ethernet segments aISS1-aISS4 as objects of remote management (for example, Ethernet segment aISS3), and stores the search results in the internal memory as configuration information of Ethernet segment aISS3 which is the object of remote management. The communication device aTS detects whether there is any change (difference) in the configuration of Ethernet segment aISS3, by comparing the stored search results with the configuration information which is previously notified to the center system CS.

When it is detected that there is a configuration change, the communication device aTS transmits the configuration change information to the managing server SV of the center system CS by the timing of notification of configuration change (in this case, "immediate"), and at the same time, the communication device aTS transmits the same information to the network administrator terminals aPK-nPK connected to Ethernet aISN (in the case of FIG. 5, the administrator terminal aPK).

Moreover, by the timing of device state search (for example, "once per day at AM 12:00"), the communication device aTS acquires management information (such as device state information and working state information) of the customer devices as objects of remote management (for example, copier aFS1 of the IP address "192.168.10.2", copier aFS2 of the IP address "192.168.20.2" in the case of FIG. 5).

This management information is acquired as follows. The communication device aTS acquires the device information of the devices of the IP addresses "192.168.10.2" and "192.168.20.2." which are objects of remote management by using HTTPS (SOAP), and stores the acquired management information in the internal memory as device management information. And the communication device aTS detects whether there is any problem in the management information, such as a failure or a change of working state of the device. If there is a change of the device working state, the communication device aTS transmits the device management information to the center system CS by the specified timing of notification of device state change (for example, "immediate"), and at the same time, the communication device aTS transmits the same information to the network administrator terminals aPK-nPK connected to Ethernet aISN (in the case of FIG. 5, the administrator terminal aPK).

In this case, when the notice of the device state change of the objects of remote management in the respective customer sites KSa-KSn from one of the communication devices aTS-nTS of the respective customer sites KSa-KSn is received, the center system CS stores the device state change notice information of the corresponding one of the customer sites KSa-KSn in the administrative database DB, and outputs the device state change information in a report form. The output information is notified to the network administrator and/or the device administrator of the customer sites KSa-KSn, if needed. When the device state change information contains a need for repair of a customer device, the service person in charge of that customer device is searched, and then the notice of device state change and a necessary recovery measure are notified to the service person in charge of that customer device.

Therefore, when there is a change in the device state of any of the customer devices as objects of remote management, the device state change information can be recognized promptly by both the center system CS and the customer sites KSa-KSn, and the necessary recovery measure can be taken promptly, and management of the customer devices can be performed appropriately and promptly.

The present invention is applicable to the remote management system in which the communication device performs automatic collection of management and configuration information required for remote management of customer devices as objects of remote management connected to the network segments and transmits the collected information to the central management device, and the central management device receives the management and configuration information from the communication device, and performs central management of the customer devices.

The present invention is not limited to the above-described embodiments, and variations and modifications may be made without departing from the scope of the present invention.

Further, the present application is based on and claims the benefit of priority of Japanese patent application No. 2006-055288, filed on Mar. 1, 2006, the entire contents of which are hereby incorporated by reference.

What is claimed is:

1. A communication device which is provided in a network including a plurality of network segments to which customer devices are connected respectively, the communication device being connected through a cable or radio communication line to a central management device so that management information required for remote management of the customer devices is exchanged between the communication device and the central management device through the communication line, the communication device comprising:

a searching unit searching customer devices connected to a predetermined network segment among the plurality of network segments in the network by predetermined timing; and a transmitting unit transmitting segment configuration information of the predetermined network segment as a result of device searching by the searching unit through the communication line to the central management device by predetermined timing, wherein the communication device further comprises a configuration storage unit storing segment configuration information for every network segment as a result of device searching by the searching unit therein, and wherein the searching unit searches customer devices for every network segment by predetermined timing, and determines whether there is a change in segment configuration information as a result of device searching by the searching unit, by comparison with the segment configuration information of a corresponding network segment stored in the configuration storage unit, and when a change in segment configuration information of the corresponding network segment occurs, the transmitting unit transmits configuration change information as a result of determination to the central management device by predetermined timing.

2. The communication device according to claim 1, wherein the communication device is provided so that, when a request for searching customer devices connected to a specified network segment is received from the central management device, the searching unit searches customer devices connected to the specified network segment indicated by the received request.

3. The communication device according to claim 1, further comprising a storage unit storing the segment configuration information as a result of device searching by the searching unit therein, and the transmitting unit transmits the segment configuration information, stored in the storage unit, to the central management device by predetermined timing.

4. A remote management system in which a central management device and a communication device, provided in a network including a plurality of network segments to which customer devices are connected respectively, are connected through a cable or radio communication line, and management information required for remote management of the customer devices is exchanged between the central management device and the communication device through the communication line so that the management information for every customer device is stored in the central management device and the remote management system performs the remote management of the customer devices based on the stored management information, the communication device comprising:

a searching unit searching customer devices connected to a predetermined network segment among the plurality of network segments in the network by predetermined timing; and a transmitting unit transmitting segment configuration information of the predetermined network segment as a result of device searching by the searching unit through the communication line to the central management device by predetermined timing, and the central management device comprising:

a management-information storage unit storing the management information for every customer device therein;

a configuration-information storage unit storing, when the segment configuration information of the predetermined network segment is received from the communication device, the received segment configuration information therein; and an outputting unit outputting the segment configuration information stored in the configuration-information storage unit, wherein the communication device further comprises a configuration storage unit storing segment configuration information for every network segment as a result of device searching by the searching unit therein, wherein the searching unit searches customer devices for every network segment by predetermined timing, and determines whether there is a change in segment configuration information as a result of device searching by the searching unit, by comparison with the segment configuration information of a corresponding network segment stored in the configuration storage unit, and when a change in segment configuration information of the corresponding network segment occurs, the transmitting unit transmits configuration change information as a result of determination to the central management device by predetermined timing, and wherein the central management device is provided so that the segment configuration information stored in the configuration-information storage unit is corrected based on the received configuration change information, and the outputting unit outputs the configuration change information.

5. The remote management system according to claim 4, wherein the communication device is provided so that, when a request for searching customer devices connected to a specified network segment is received from the central management device, the searching unit searches customer devices connected to the specified network segment indicated by the received request.

6. The remote management system according to claim 4, wherein the communication device further comprises a storage unit storing the segment configuration information as a result of device searching by the searching unit therein, and the transmitting unit transmits the segment configuration information stored in the storage unit, to the central management device by predetermined timing.

7. The remote management system according to claim 4, wherein the communication device is provided so that the transmitting unit collects management information of customer devices for every network segment or every customer device and transmits the management information to the central management device, and the central management device is provided so that the management-information storage unit stores the management information received from the communication device, and the central management device performs the remote management of the customer devices based on the management information stored in the management-information storage unit and the segment configuration information stored in the configuration-information storage unit.

8. The remote management system according to claim 4, wherein the central management device notifies the communication device of a specified destination of the segment configuration information and/or the management information, and the transmitting unit of the communication device transmits the segment configuration information and/or the management information to the specified destination.

* * * * *